A. FREEMAN.
VEGETABLE AND FRUIT RECEPTACLE.
APPLICATION FILED OCT. 3, 1919.

1,366,781.

Patented Jan. 25, 1921.

INVENTOR.
Albert Freeman,
BY Walter N. Haskell
his ATTORNEYS.

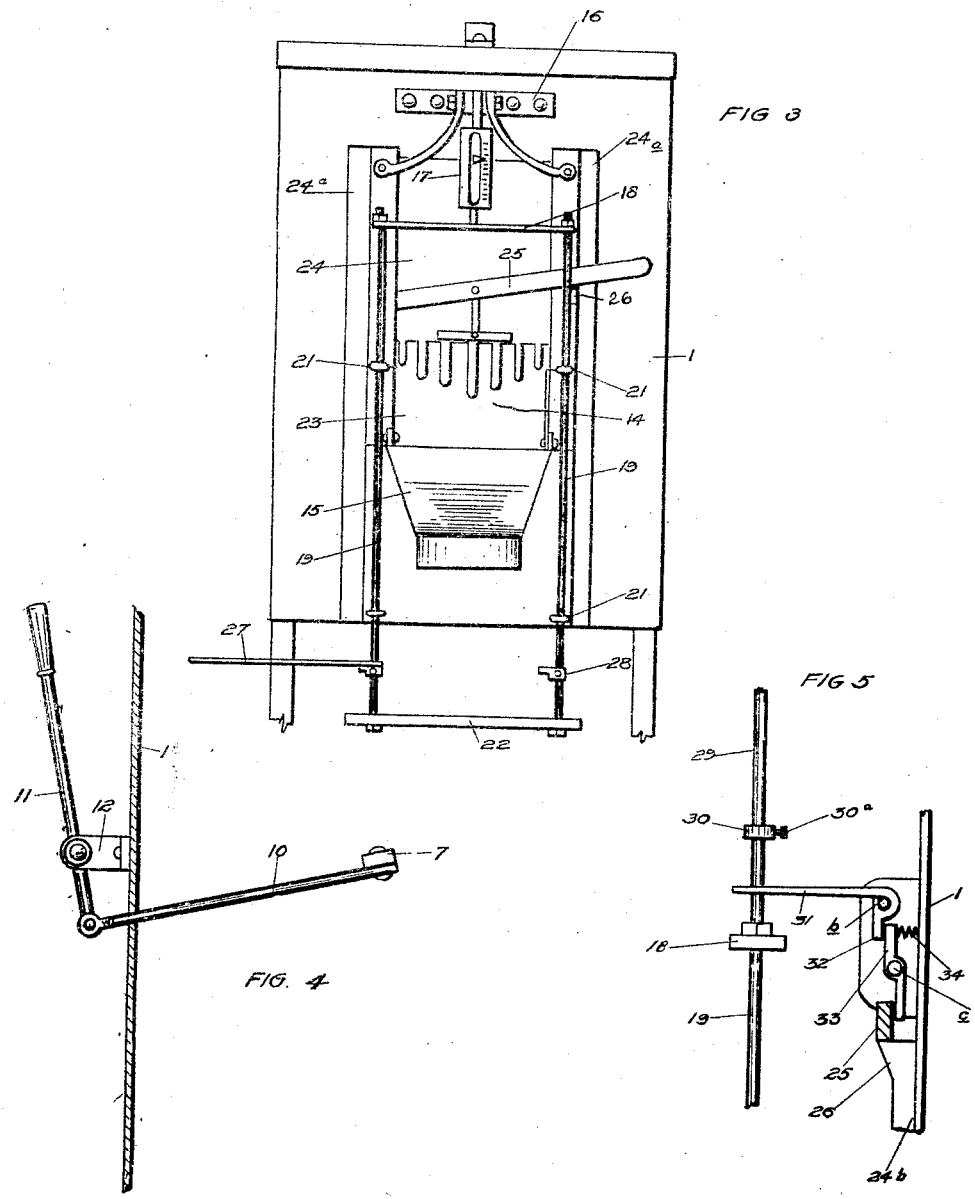

UNITED STATES PATENT OFFICE.

ALBERT FREEMAN, OF MOLINE, ILLINOIS.

VEGETABLE AND FRUIT RECEPTACLE.

1,366,781.  Specification of Letters Patent.  Patented Jan. 25, 1921.

Application filed October 3, 1919. Serial No. 328,092.

*To all whom it may concern:*

Be it known that I, ALBERT FREEMAN, a citizen of the United States, residing at Moline, in the county of Rock Island and State of Illinois, have invented certain new and useful Improvements in Vegetable and Fruit Receptacles, of which the following is a specification.

My invention has reference to vegetable and fruit receptacles, and is designed for use in a retail store in which such articles are on sale, and more particularly for the handling and weighing of potatoes in small quantities. When an employee of a store is engaged in filling a small sack or bag from a basket or other receptacle, there is a temptation to pick out the largest potatoes, on account of the fact that less time is required in which to handle them, with the result that the smaller or average sized potatoes are left in the bottom of the basket. When the sack is thought to contain somewhere near the desired amount, it is placed on a scale, and, if the weight is not correct, more potatoes are added, or taken out of the sack, until the right amount is obtained. This requires considerable time and trouble.

By the use of my invention it is possible to quickly fill a sack with the vegetables without the necessity of handling the same, and have them automatically weighed, so that as soon as the sack contains the desired amount the supply can be shut off. Auxiliary devices are also shown and described herein, by means of which this may be accomplished automatically.

The construction, arrangement, and operation of the various parts of my device will more fully appear from the following specification, reference being had to the drawings accompanying the same, in which:

Fig. 3 is a front elevation of the invention.

Fig. 4 shows the grating actuating mechanism, in detail.

Fig. 5, illustrates a trip mechanism for automatically interrupting the movement of the vegetables.

Figure 1:
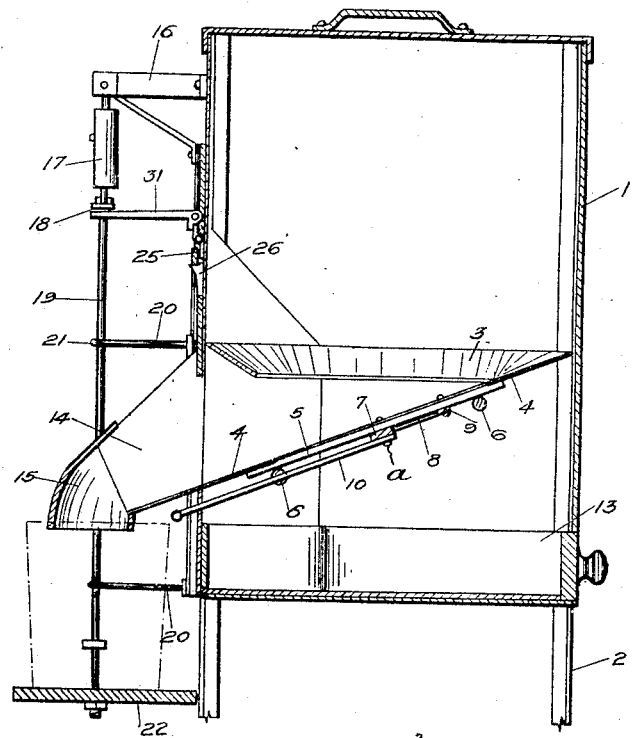
Figure 1 shows my invention in medial vertical section.
Figure 2:
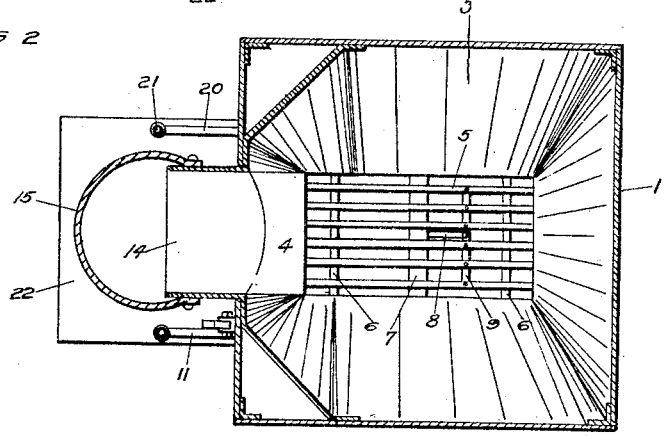
Fig. 2 is a plan view thereof, with the cover removed, partly in section.

1 represents a receptacle, formed of any desired material, provided with legs 2, of sufficient length to support the receptacle at a suitable height above the ground or floor. Said receptacle is provided with a sloping apron 3 and a forwardly inclined floor 4, having a central opening beneath which a grating 5 has longitudinal play on a pair of rollers 6, supported beneath the floor 4. Fulcrumed beneath said floor, as at *a*, is a lever 7, pivotally connected by a link 8 with a bar 9 secured to the lower side of the grating 5. To the free end of the lever 7 is pivotally connected an arm 10, which passes forwardly through the front wall of the receptacle, and is pivotally connected at its outer end with the short end of a hand-lever 11, fulcrumed in a support 12, attached to the wall of the receptacle 1. Beneath the floor 4 a drawer 13 is removably supported.

Communicating with the receptacle 1, just above the floor 4, is a chute 14, at the outer end of which is connected therewith a spout 15. To the front wall of the receptacle, near the upper end thereof, is fixed a support 16, from which is suspended a scale 17, to the pendant of which is attached a cross-arm 18. Supported by the ends of said cross-arm are rods 19, having vertical play in guides 21 on the outer ends of arms 20 fixed to the wall of the receptacle.

When the receptacle 1 is filled with potatoes, and it is desired to transfer some of them to a sack or similar receptacle, such sack is placed on the platform 22, as indicated in broken lines in Fig. 1, with the spout 15 directed into the top of the sack, after which the hand-lever 11 is actuated to cause a reciprocating movement of the grating 5, whereupon the vegetables just above such grating are fed downwardly toward the chute 14, passing through such chute and the spout 15, into the bag. The weight of the vegetables on the platform 22 gradually depresses the same, carrying downwardly therewith the cross-arm 18 and pendant of the scale 17, such scale being thereby caused to indicate the weight of the vegetables on the platform. When the desired weight has been attained the movement of the grating 5 is interrupted, and the loaded sack removed from the platform. Any tendency of the potatoes to continue their movement from the receptacle 1 after the grating 5 has ceased to be operated, can be arrested by means of a gate 24, vertically movable in ways 24ª on the front of the receptacle, and operable by means of a handlever 25, fulcrumed to one of said ways, and projecting beyond the way opposite thereto. The lower edge of the gate 24 is preferably formed with downwardly projecting fingers, so as not to cut or bruise the contents of the bin. The gate may be held in elevated position by means of a catch 26, fixed to the way at one side of the gate, upon which the lever 25 can be supported. When the bin is first supplied with vegetables the gate is closed, and in use it is gradually opened until a sufficient movement of the vegetables results from the agitation of the grating 5.

When a sack is being placed in position on the platform, the spout 15 can be turned up out of the way. If it is desired to use a smaller sack, an auxiliary shelf 27 may be employed, such shelf being swingingly mounted on one of the bars 19, so as to be turned inwardly above the platform 22, in which position the free end of the shelf is supported by a clip 28 on the opposite rod 19. When not in use such shelf is turned outwardly out of the way.

In Fig. 5 is shown a device which may be used in connection with the lever 25, for automatically releasing the gate 24 when the scale indicates that the sack contains the desired amount of potatoes. Supported on the cross-arm 18 is a rod 29, to which is attached a clip 30, by means of a set-screw 30$^a$, so as to be held in adjusted positions on said rod. A lever 31 is fulcrumed at $b$ on a support fixed to the front wall of the receptacle 1, the short arm 32 of said lever being in engagement with one end of a trigger 33, fulcrumed at $c$, the other end of said trigger being extended in rear of the lever 25, when it rests upon the catch 26. The arm 31 projects into the line of travel of the clip 29, which moves downwardly with the platform 22 and supportnig frame thereof, said clip being positioned so that when the desired amount of potatoes has been transferred to the platform the clip will come in contact with the arm 31, forcing the same downwardly, and causing the trip 33 to move the lever 25 outwardy, releasing the same from the catch. The trigger 33 and lever 31 are returned to their normal positions when the weight is removed from the platform, by means of a coiled spring 34, in rear of the upper arm of said trigger.

By having the operating lever for the grating 5 located on the front of the machine, it is possible for the operator to actuate the same and watch the scale 17 at the same time. The dirt which falls through the grating is received by the drawer 13, from which it can be emptied, as required.

What I claim and desire to secure, is:

A device of the class described, comprising a suitably mounted receptacle; an inclined floor therefor, having a movable open-work section; a chute on the outside of said receptacle, communicating therewith above said floor; means for actuating said movable section, to cause a movement of the contents of said receptacle toward said chute; and an auxiliary receptacle removably supported beneath said floor.

In testimony whereof I affix my signature.

ALBERT FREEMAN.